United States Patent [19]

Dlugos

[11] 4,320,461

[45] Mar. 16, 1982

[54] POSTAGE VALUE CALCULATOR WITH EXPANDED MEMORY VERSATILITY

[75] Inventor: Daniel F. Dlugos, Huntington, Conn.

[73] Assignee: Pitney Bowes Inc., Stamford, Conn.

[21] Appl. No.: 159,029

[22] Filed: Jun. 13, 1980

[51] Int. Cl.³ .................... G06F 15/40; G01G 19/413

[52] U.S. Cl. .................................... 364/466; 364/900; 177/25

[58] Field of Search .................. 364/466, 900; 177/25

[56] References Cited

U.S. PATENT DOCUMENTS

| | | | |
|---|---|---|---|
| 3,541,516 | 11/1970 | Senzig | 364/200 |
| 4,047,006 | 9/1977 | Ellner | 364/466 |
| 4,051,913 | 10/1977 | Gudes | 364/466 X |
| 4,056,809 | 11/1977 | Hoerning et al. | 364/200 |
| 4,064,954 | 12/1977 | Rock | 364/464 X |
| 4,084,242 | 4/1978 | Conti | 364/466 |
| 4,118,788 | 10/1978 | Roberts | 364/900 |
| 4,131,946 | 12/1978 | Dlugos | 364/466 |
| 4,138,735 | 2/1979 | Allocca et al. | 364/900 |
| 4,179,747 | 12/1979 | Dlugos | 364/466 X |

*Primary Examiner*—Edward J. Wise

*Attorney, Agent, or Firm*—Mark Levy; William D. Soltow, Jr.; Albert W. Scribner

[57] ABSTRACT

A postage value calculator system includes a processor which receives article weight, destination, class and carrier type information for transportation of the article. The processor accesses a directory which vectors to memory locations to retrieve rate data for generation of a postage value. The system includes an address counter which is incremented to access successive memory address locations. All system memories include uniformly spaced storage locations which are reserved for addressing purposes only. Each time the address counter is incremented, a check is made to determine if the location reached is reserved for addressing data. If the location is not reserved for addressing data, the stored postal information is used for the postage computation routine. When the incremented address is that of the addressing data, the word stored in the memory is loaded into the upper byte of the address counter, the lower order byte is set to zero, and the program continues at the new address. Conservation of memory space and increased memory versatility is thereby obtained.

10 Claims, 4 Drawing Figures

| | 1K | 2K | 3K | 4K |
|---|---|---|---|---|
| 0 | DIRECTORY | | | |
| 1 | USPS RATE CHART | | | |
| 2 | USPS RATE CHART | | | |
| 3 | USPS RATE CHART | | | |
| 4 | UPS | | | |
| 5 | BLANK | | | |
| 6 | UPS | | | |
| 7 | BLANK | | | |
| 8 | INTERNATIONAL | | | |
| 9 | INTERNATIONAL | | | |
| A | INTERNATIONAL | | | |
| B | BLANK | | | |
| C | ZIP TO ZONE | ZIP TO ZONE | | |
| D | CUSTOM RATE | CUSTOM RATE | | |
| E | BLANK | | | |
| F | BLANK | | | |

22

POSTAGE VALUE CALCULATOR WITH EXPANDED MEMORY VERSATILITY

RELATED APPLICATIONS

This application discloses a postage value calculator with expanded memory versatility and is related to a co-pending application of Daniel F. Dlugos, Gary G. Hansen and John H. Steinmetz, entitled "System and Method for Computing Domestic and International Postage", Ser. No. 070,234, filed Aug. 27, 1979, now U.S. Pat. No. 4,286,325, and assigned to the assignee of the present invention.

BACKGROUND OF THE INVENTION

1. Field of the Invention

This invention relates generally to a postage value calculation system and more particularly to an apparatus and method for improved postage value calculations through an enhanced information storage and retrieval system.

2. Brief Description of the Prior Art

Various devices and methods for calculating postage have been proposed heretofore. These systems varied from a simple postage value storage table as shown in U.S. Pat. No. 3,635,297 issued Jan. 18, 1972 to more elaborate postage value systems featuring the use of microprocessors as illustrated in U.S. Pat. No. 3,978,457 by Frank P. Check, Jr. et al, issued Aug. 31, 1976 and assigned to the assignee of the present invention.

In these prior systems, the storage of postage rate data has been a formidable problem. In systems which included memories comprised of storage tables, a great amount of memory space was required to provide data necessary in many postal variations including destination, zone, priority, class, carrier type, etc. When a change in postal rates was effected by the postal service, the memory units had to be changed at considerable expense in time, money and inconvenience. In postage value calculators of more elaborate systems, rate changes often required reprogramming or software change.

Further problems have been encountered with regard to the allocation of rate and other data in memory systems. Memory allocation maps were employed for graphically defining memory systems to specify areas reserved for particular data. Generally, data for use in specific subroutines were stored at consecutive address locations. This practice often resulted in gaps of available storage locations for future expansion. Furthermore, when postal rate changes necessitated the addition of new postal rate data to be accessed during a particular subroutine, entire memory blocks were often required to be revised and reallocated. Rate changes often necessitated the revision of data stored at further locations which may have been used to define data parameters such as weight range boundaries, memory length or the system directory itself.

Although indirect addressing techniques provide some degree of flexibility, programming changes were often required in conjunction with newly stored data to be indirectly addressed. Such programming changes increased the possibility of system errors.

SUMMARY OF THE INVENTION

In compendium, the present invention relates to a postage value calculator which determines the postage of an article to be mailed and which features a new system for storing and accessing postage rate information in a memory. The postage value calculator includes a system processor which receives postal information such as class of delivery, carrier type, destination and article weight from input devices. To address stored rate data for postage computation, the processor first accesses a directory with the aforementioned information. The rate data is employed to generate the requisite postage value which is then displayed and/or fed to a meter setting device to dispense the calculated postage.

Each memory section accessed by the processor includes equidistantly spaced storage locations wherein the memory stores not working data but the address of the next byte of stored data for the program. The processor accesses memory locations in conjunction with an incrementing address counter. Each time the address counter is incremented, the processor determines whether the newly incremented address is that of the stored addressing data rather than working data. When the generated address is that of the stored addressing data, the processor loads the addressing data into the address counter and the program continues at the new address.

From the above compendium, it will be appreciated that it is an object of the present invention to provide a postage value calculating system which is not subject to the disadvantages of the prior art as aforementioned.

A further object of the present invention is to provide a postage value calculating system of the general character described which permits changes in stored memory without requiring system reprogramming.

A further object of the present invention is to provide a postage value calculating system of the general character described with increased memory versatility.

Another object of the present invention is to provide a postage value calculating system of the general character described which facilitates simplified revision of stored rate data.

Another object of the present invention is to provide a processor controlled calculating system of the general character described with enhanced information storage and retrieval capabilities.

A still further object of the present invention is to provide a method for information storage and retrieval of the general character described which permits memory revision and expansion into other than contiguous memory locations without reprogramming.

Further objects of the present invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figures 1, 2:
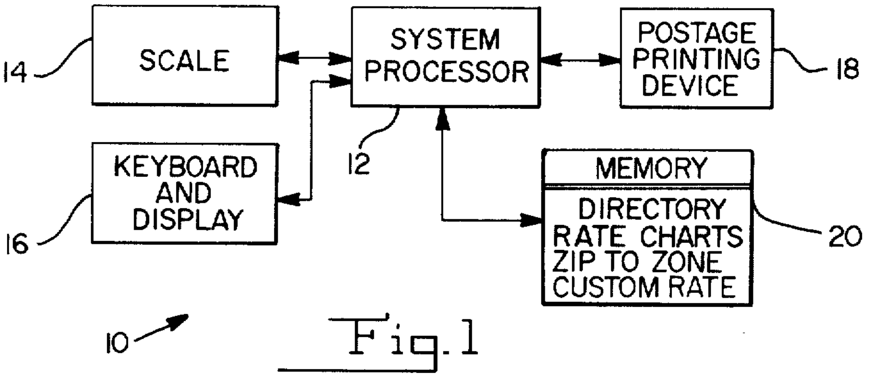
FIG. 1 is a schematized block diagram of a postage value calculator system constructed in accordance with and embodying the present invention.
FIG. 2 is a schematized memory map of the memory space allocations used in conjunction with the postage value calculator system of the present invention and graphically depicting a cage having a plurality of plug-in PROMS for information storage and retrieval and illustrating typical distributions of postage rate data in various PROM locations.

Referring now in detail to the drawings, the reference numeral 10 denotes generally a postage value calculator system constructed in accordance with and embodying the present invention. The system 10 includes a processor 12 which is linked with a plurality of input/output devices such as a scale 14, a keyboard and display 16, and a postage printing device 18. The processor 12 receives postal information such as the article destination, class, carrier type, etc., from the keyboard 16 and additionally receives weight information necessary for postage calculation from the scale 14.

The processor accesses a memory depicted generally by the reference numeral 20 to retrieve stored information necessary for the generation of a postage value for the article. It should be appreciated that a more detailed description of the communications links between the system processor and the various input/output devices, as well as the memory and a typical program for implementing the system, are more fully shown in the co-pending related application entitled System and Method for Computing Domestic and International Postage, Ser. No. 070,234, filed Aug. 27, 1979, now U.S. Pat. No. 4,286,325, and assigned to the assignee of the present invention.

As more completely described in such co-pending related application, after the processor has received information relating to class of carrier service, article weight, type of carrier destination, etc., a directory stored in the memory 20 is accessed. After accessing the directory, the program is vectored to an appropriate rate chart stored in the memory. Each rate chart includes a weight header which stores various boundary conditions such as weight limits, weight increments, overside weight data, the address of appropriate zip to zone conversion tables, and the address for the next rate chart if the article weight exceeds the limit. The rate charts additionally include dollar headers which define parameters for use of dollar table data stored at subsequent locations in the rate chart.

In accordance with the present invention, expanded memory versatility is obtained by reserving uniformly spaced memory locations for the storage of a linking byte, i.e. the address of the next byte of working memory data. When the processor pages through the memory during a program, the processor determines whether the newly incremented address is that which is reserved for the linking byte rather than working data. If the address reached is that of the linking byte, the processor replaces the higher order byte of the address counter with the linking byte stored at the memory location and zeroes the lower order byte of the address counter. The program then continues at the new address to obtain the next memory word which is contiguous to the program.

By way of example, when hexadecimal notation is employed for designating memory locations, each time the address counter has incremented to a location XXFF wherein XX is 0 through F, a memory location has been reached which is spaced 256 locations from the proceeding XXFF location. Pursuant to the invention, at each XXFF location, the eight bits stored in the memory will be a linking byte. The processor is programmed to indiscriminately load each linking byte into the address counter when an XXFF location has been reached.

In FIG. 2 a typical memory map 22 for the postage calculation system 10 is illustrated. The memory 20 may comprise a cage which carries a plurality of plug-in circuit boards, each containing MOS or bipolar PROMs. Each PROM circuit board may contain, for example, from 1K through 4K word storage locations. In the allocation as depicted on the map 22, a 1K PROM is employed for the storage of information comprising the system directory in row 0. The next three successive rows each contain 1K PROMs comprising United States Postal Service rate chart data. The fourth and sixth rows contain 1K PROMs which store United Parcel Service rate data and the fifth and seventh rows are blank. The eighth, ninth and A rows each contain a 1K PROM which stores international postage data. A 2K PROM is positioned in row C and contains tables for zip to zone postal conversion and row D carries a 2K PROM which stores custom rate data. Rows B, E and F are blank and have been reserved for expansion.

Figure 3:
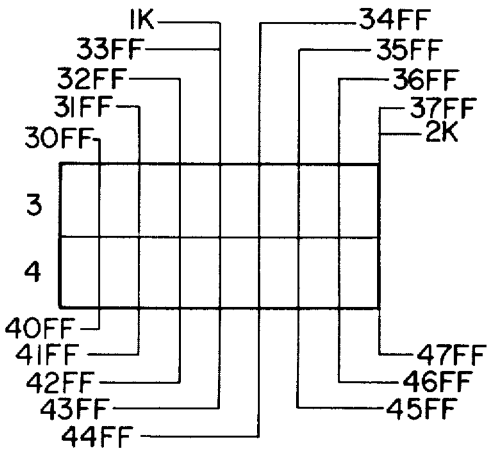
FIG. 3 is an enlarged illustration of a segment of the memory depicted in FIG. 2 and showing the position of uniformly spaced memory locations wherein addressing data rather than other information is stored for expanded memory versatility.

In FIG. 3 a segment of the first 2K locations of memory in rows 3 and 4 is illustrated. Additionally shown are each of the XXFF locations for this segment of the memory and an indication of the hexadecimal notations for such locations.

Each memory location is indicated in the address counter in binary format as two bytes with the lower order byte incrementing at each address for a cycle of 256 increments (00 through FF in hexadecimal format and 00000000 through 11111111 in binary format). The higher order byte of the address counter denotes the row and position within each PROM at which the increments commence.

Assuming the program has reached the USPS rate chart stored in row 3, the first location address (hexadecimal 3000) is accessed and the data stored in such location employed in conjunction with the program.

Figure 4:
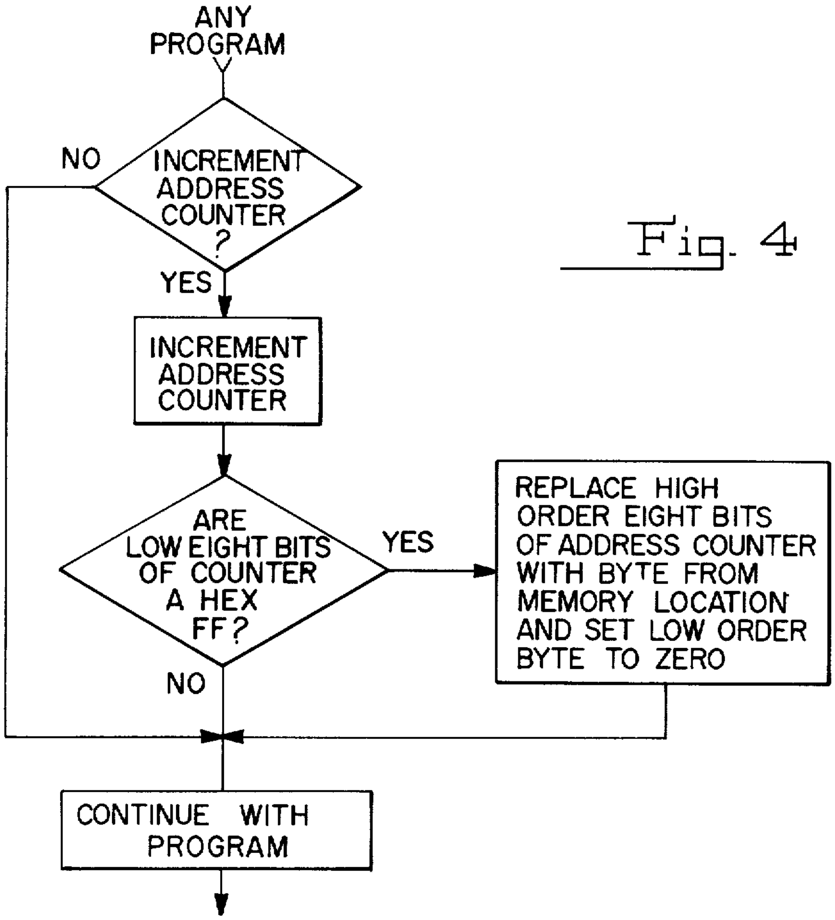
FIG. 4 is a flow diagram of a typical subroutine in accordance with the present invention whereby a processor determines whether a location which has been reached when paging through a memory section is that of addressing data, and if so, accesses the memory location at such stored address for the purpose of continuing the program.

Referring now to FIG. 4, it will be seen that the program inquires as to whether the address counter is to be incremented. If the counter is not required to be incremented, the program continues. If, however, the counter is required to be incremented for the address of the next memory location, the counter is incremented and a determination is made as to whether the low eight bits of the counter comprise a hexadecimal FF (all eight bits high in binary format. This inquiry is in fact a determination as to whether or not one of the equidistantly spaced storage locations of a linking byte has been reached.

When the low eight bits of the address counter do not comprise a hex FF, the program continues. If, on the other hand, the low eight bits comprise a hex FF, this means that the location reached is that of one of the uniformly spaced memory locations of a linking byte. On such instance, the program replaces the high order eight bits of the address counter with the linking byte stored at the memory location and the low order byte of the counter is set to zero. Thereafter, the program continues.

Referring again to FIG. 3, assume the address counter has continued through the first 255 increments of the first section of memory and the next section of working memory is physically positioned immediately thereafter. When the address counter increments to 30FF, the linking byte stored at this location replaces the existing high order byte in the address counter. In this instance, the linking byte will comprise a hexadecimal 31. In accordance with the routine of FIG. 4, the low order byte in the address counter is zeroed. Thus, the program continues at the next memory location, a hexadecimal 3100.

With the program indiscriminately verifying whether or not the address of a linking byte has been reached, great versatility in memory revision and expansion is obtained without the necessity for reprogramming. Thus, for example, if the 1K USPS rate chart located in row 3 was required to be explained at a later date due to postal service rate revisions, the final linking byte of the original 1K PROM (33FF location) would be revised to indicate the starting location of the next contiguous memory section. This may be conveniently placed at any area in the memory cage, for example, after the 1K PROM in row 4. If the continuing USPS rate chart were placed after the 1K UPS PROM in row 4, the linking byte at location 33FF would comprise a hexadecimal 44 and the program would be directed to memory location 4400.

Since the subroutine for determining whether the address of a linking byte has been reached is only provided when the address counter is incremented, when an absolute address is loaded into the address counter, this inquiry need not be made.

It should be appreciated that pursuant to the present invention, sections of memory can be expanded, modified and revised to be physically disjointed, yet will always appear contiguous to the program.

In addition, memory changes may be made to reflect postage rate changes without the necessity of revising the respective weight headers or revising the directory.

While the present invention has been described and illustrated with reference to a postage value calculator, the invention is well suited for other calculating systems wherein a processor accesses memory locations and where subsequent memory revision and/or expansion is contemplated.

Various changes to the system and method herein described are readily apparent to those skilled in the art. Accordingly, the present invention should not be constrained to implementations wherein memory address locations are provided in two bytes as illustrated. Additionally, the number of increments between equidistantly spaced address storage locations may vary between systems and only a typical example of many feasible variations has been described.

Thus it will be seen that there is provided a postage value calculator with expanded memory versatility which achieves the various objects of the invention and which is well adapted to meet the conditions of practical use.

As various changes might be made in the invention as above set forth, it is to be understood that all matter herein described and shown in the accompanying drawings is to be interpreted as illustrative and not in a limiting sense.

Having thus described the invention, there is claimed as new and desired to be secured by Letters Patent:

1. A postage value calculator comprising
means for introducing postal information,
memory means for storing postage data at a plurality of storage locations,
accessing means for retrieving the postage data from the memory means in accordance with the introduced postal information, the accessing means including an address counter for generating an address of a memory storage location, and
means for generating a postage value in accordance with the retrieved postage data,
the calculator further including
addressing data,
selected storage locations of the memory means storing the addressing data, the selected storage locations being equidistantly spaced from one another by a predetermined number of consecutively positioned memory storage locations, the addressing data stored at the equidistantly spaced selected storage location comprising data for determining the memory location of the next sequential segment of postage data requisite for generation of a postage value, and
means for determining when an accessed memory address is a selected storage location address, the determining means including means for examining the storage location address generated by the address counter.

2. A postage value calculator constructed in accordance with claim 1 wherein the address counter generates a memory location address comprising a higher order byte and a lower order byte, the addressing data stored at selected storage locations comprising one byte of a memory location address.

3. A postage value calculator constructed in accordance with claim 1 wherein each selected storage location is spaced 256 consecutive storage locations from an adjacent selected storage location.

4. A postage value calculator constructed in accordance with claim 1 further including a processor, the processor comprising the means for generating a postage value and the determining means.

5. A method of storing and retrieving information in a calculator system comprising a processing unit, an input device and a memory, the processing unit receiving information from the input device and accessing the memory to obtain a result, the method comprising the steps of
(a) storing working data for obtaining the result in the memory at a plurality of storage locations,
(b) storing information comprising addressing data at selected storage locations in the memory which are equidistantly spaced from one another by a predetermined number of consecutively spaced memory storage locations,
(c) sequentially accessing successive memory locations,
(d) determining whether a sequentially accessed memory location carries working data or addressing data by examining an accessed memory location address, and (e) if it is determined that the accessed location carries working data, retrieving the working data and employing the working data for generating the result, (f) if it is determined that the accessed memory location carries addressing data, retrieving the addressing data and employing the addressing data for determining the memory storage location of the next sequential portion of the working data, whereby increased memory versatility is provided.

6. A method of storing and retrieving information in a calculator system in accordance with claim 5 wherein successive memory locations are accessed by incrementing an address counter, the step of determining whether the sequentially accessed memory location carries working data or addressing data including the step of examining the address generated by the address counter.

7. A method of storing and retrieving information in a calculator system as claimed in claim 5 wherein the addressing data is stored at memory locations spaced 256 consecutive storage locations from adjacent stored addressing data.

8. A method of storing and retrieving information in a calculator system as claimed in claim 5 wherein the step of storing addressing data includes the step of storing addressing data at successive memory locations bearing the hexadecimal notation XXFF wherein X may comprise 0 through F.

9. A method of storing and retrieving information in a calculator system as claimed in claim 5 wherein each memory location is defined by an address comprising two bytes, the addressing data comprising one byte of a memory location address, the step of employing the addressing data for determining the memory storage location of the next sequential portion of working data including the step of replacing one of the bytes of the sequential address with the addressing data.

10. A method of storing and retrieving information in a calculator system as claimed in claim 9 further including the step of clearing the other byte of the memory address.

* * * * *